United States Patent [19]

Moss

[11] Patent Number: 4,761,531

[45] Date of Patent: Aug. 2, 1988

[54] TORCH WITH IMPROVED AIR FLOW

[76] Inventor: Paul B. Moss, 202 S. Lansing, Tulsa, Okla. 74120

[21] Appl. No.: 115,594

[22] Filed: Oct. 26, 1987

Related U.S. Application Data

[63] Continuation of Ser. No. 866,404, Oct. 14, 1986, abandoned.

[51] Int. Cl.$^4$ .............................................. B23K 9/28
[52] U.S. Cl. ...................................................... 219/70
[58] Field of Search ........................... 219/70, 69 R, 68

[56] References Cited

U.S. PATENT DOCUMENTS

| | | | |
|---|---|---|---|
| 2,899,536 | 8/1959 | Hoese et al. | 219/70 |
| 3,573,419 | 4/1971 | Henderson | 219/70 |
| 3,659,072 | 4/1972 | Carkhuff et al. | 219/70 |
| 3,735,085 | 5/1973 | McCall et al. | 219/70 |
| 4,300,033 | 11/1981 | Scarton et al. | 219/70 |
| 4,315,126 | 2/1982 | Schaefer et al. | 219/70 |

Primary Examiner—A. D. Pellinen
Assistant Examiner—Geoffrey S. Evans
Attorney, Agent, or Firm—Head & Johnson

[57] ABSTRACT

A holder for an arc-forming electrode which directs the flow of air in the direction toward the arc formed by the electrode, the holder being formed of an elongated metallic body having an air supply hose and an electrical conductor attached to it, the body also having a cylindrical nozzle head rotatably affixed at the forward end, the turret having an upper surface with a notch formed therein to receive an electrode, the nozzle head having an internal passageway and a cylindrical external sidewall having an air jet opening communicating with the passageway and arranged to eject air in alignment with the notch, the body having a passageway therein communicating air supplied by the hose to the nozzle head and a tong member pivotally affixed to the body having a spring for releaseably retaining an electrode in contact with the notched upper surface of the nozzle head.

2 Claims, 3 Drawing Sheets

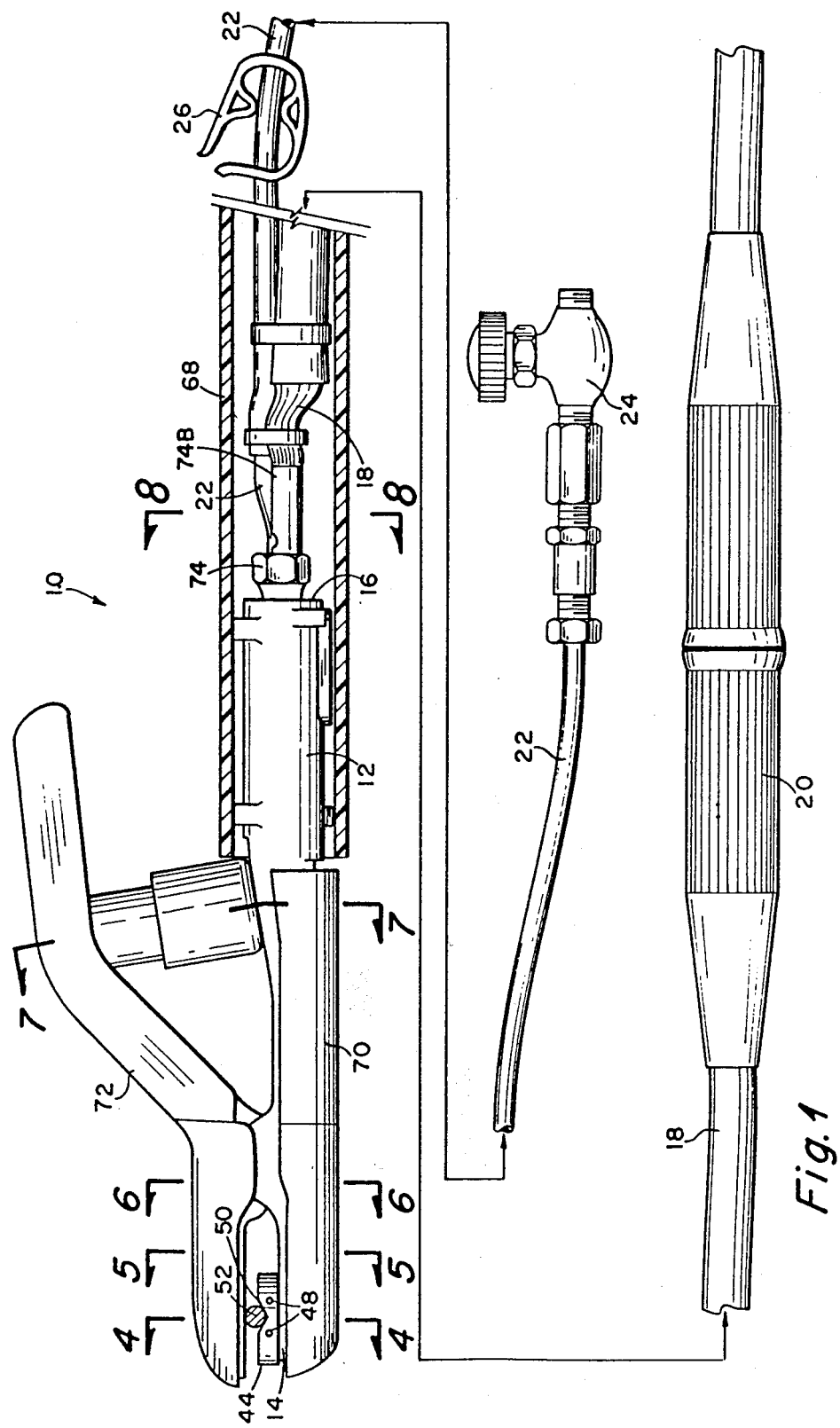

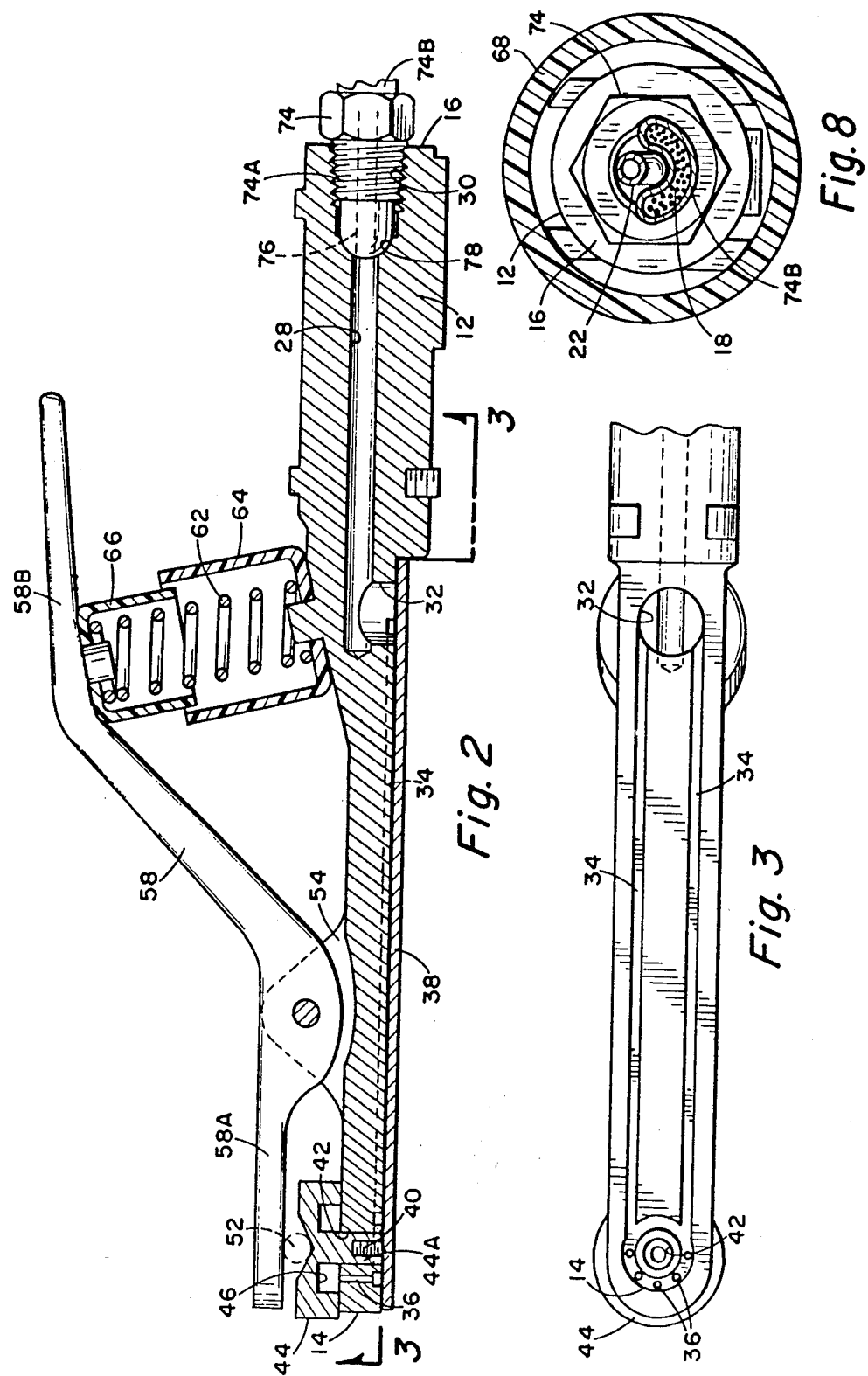

4,761,531

TORCH WITH IMPROVED AIR FLOW

This is a continuation of application Ser. No. 866,404 filed Oct. 14, 1986, now abandoned.

SUMMARY OF THE INVENTION

A technique for cutting metal is that of imposing a low-voltage high current source between the work piece to be cut and a carbon electrode. The electric arm formed between the electrode and the workpiece creates an area of high heat intensity which melts a localized area of the work piece. To remove the molten metal formed in the localized area an air stream is directed to blow it away.

For examples of torches which have been designed to support carbon arc electrodes for cutting operations reference may be had to the following U.S. Pat. Nos. 4,045,642; 4,150,276; and 4,317,024.

One problem with many torches designed to hold carbon arc electrodes is that they typically are useable only for holding an electrode pointing in the plane of the torch handle. In some applications it is desirable that the user be able to extend the arc in an angle other than in the plane of the torch body and that when so extended, the flow of air is directed along the electrode so as to blow away molten metal formed at the electrode tip. The present invention provides a unique torch for holding a carbon arc electrode in which the user may orient the electrode at substantially any angle desired with respect to the torch. To accomplish this objective a holder for an arc forming electrode is provided having an elongated metallic body having a forward and a rearward end. Affixed to the rearward end of the metallic body is an air supply hose and an electrical conductor.

A cylindrical nozzle head is rotatably affixed at the body forward end. The nozzle head has an upper surface having a notch formed in it to receive one end of an electrode, The nozzle head has an internal passageway therein and a cylindrical external sidewall having at least one air jet opening communicating with the passageway and oriented to eject air in alignment with the notch. The torch body has a passageway communicating with the passageway in the nozzle bead so that air supplied by the hose is passed through the body, into the rotatable nozzle head and out the air jet openings.

An elongated tong member is pivotally affixed to the body. The tong member has a forward portion extending over and adjacent the nozzle bead and a rearward, handle forming portion extending over the rearward portion of the body. A spring resiliently urges the tong handle portion away from the body and thereby the forward portion in the direction towards the nozzle head so that an electrode positioned in the notch is held in position by the tong member irrespective of the direction of orientation of the nozzle head.

A better understanding of the invention will be had with reference to the following description and claims, taken in conjunction with the attached drawings.

DESCRIPTION OF THE DRAWINGS

FIG. 1 is an elevational, partial cross-sectional view of a torch embodying the principles of this invention and showing the air hose and electrical connector as employed with the torch.

FIG. 2 is an elevational side view of the torch of FIG. 1 showing the insulation covers removed and showing the body of the torch in cross-sectional configuration.

FIG. 3 is a cross-sectional view taken along the line 3—3 of FIG. 2 showing the internal air passageway in the torch body.

FIG. 8 is a cross-sectional view taken along the line 8—8 of FIG. 1 showing how the air hose and electrical conductor are connected to the body of the torch.

DESCRIPTION OF THE PREFERRED EMBODIMENT

Figure 4:
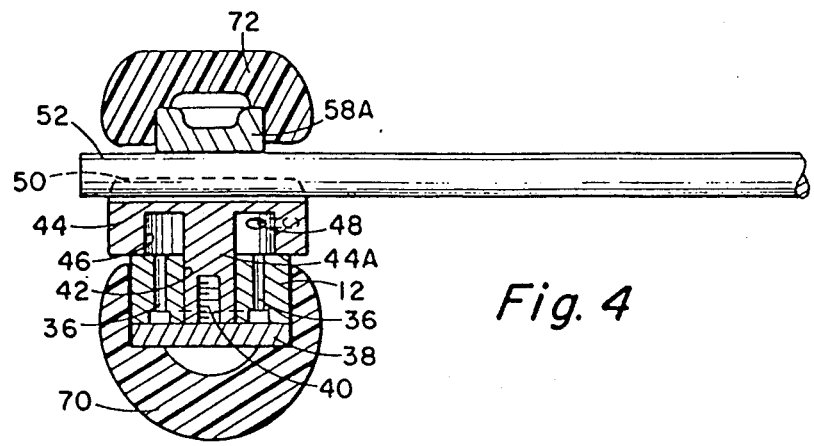
FIG. 4 is a cross-sectional view taken along the line 4—4 of FIG. 1 showing the nozzle head and the means of supporting an electrode in the torch.
Figure 5:
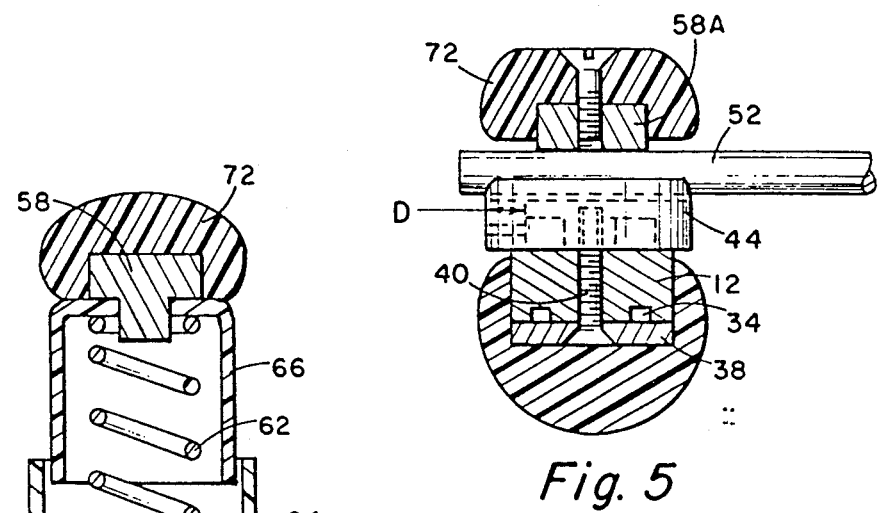
FIG. 5 is a cross-sectional view taken along the line 5—5 of FIG. 1 showing more details of the construction of the torch.

Referring to the drawings and first to FIG. 1 a torch which embodies the invention is generally illustrated by the numeral 10 and includes a metallic body portion 12 having a forward end 14 and a rearward end 16. Affixed to the rearward end 16 is an electrical conductor 18 which extends to a quick connect-disconnect fitting 20 so that the torch can easily be connected to or removed from a source of low voltage electrical energy.

Also affixed to the torch body rearward end 16 is an air hose 22 which extends to a flow control valve 24. The valve is typically connected to a source of air pressure. Received on the hose 22 is a pinch-type ON-OFF control 26 which is positioned close to the end of the torch so that the operator can cut the air supply off when the torch is not being used. The valve 24 is typically employed to control the quantity of air flow whereas the ON-OFF device 26 is merely used to close off the air when it is not being used.

Referring to FIG. 2, more details of the torch body are shown. The body 12 is of metallic, electrically conductive material. The rearward end of the body has a passageway 28 with a threaded portion 30 by which the air hose 22 is attached. The passageway 28 is formed by drilling an opening through the rearward end 16 of the body and by a second drill hole 32 intersecting the passageway 28. Grooves 34 (See FIG. 3) extend from the second passageway 32. The grooves are in the bottom surface of the body 12 and extend to holes 36 formed in a semi-circular pattern adjacent the body forward end 14. A cover 38 is held in place by screws 40 and closes the grooves 34 so that the air passageway extends all the way from the rearward end of the body to adjacent the forward end.

Near the forward end of the body is a hole 42, the axis of the hole 42 being also the semi-circular axis of the placement of the hose 36. A cylindrical nozzle head member 44 has a downwardly extending central shaft portion 44A received in the opening 42 and is held in place by screw 40A. Thus, the nozzle head 40 is rotatable relative to the body.

The nozzle head 40 also has a circumferential internal recess 46 surrounding the integral shaft portion 44A and which is in communication with the holes 46 formed in the body. Thus, air is communicated from the body to the interior of the nozzle head member 44. As seen in FIG. 1, the nozzle head member 44 has holes 48 extending from the external circumferential surface to the recess 46 so that air delivered to the torch flows out through the nozzle head holes 48.

The holes 48 are preferably dimensioned so that their length is at least three times their internal diameter. As an example, the holes 48 may be 1/16 inch internal diameter and of length at least 3/16" or greater. The length is determined by the difference between the internal diameter of recess 46 and the external diameter of the nozzle head member 44. By having the dimensions of holes 48 arranged, in this ratio a highly improved rifling effect is achieved so that the air blowing out the holes more effectively blows away molten metal. In addition, the axis of the holes should be inclined slightly upwardly towards the outer end of the electrode 52.

Provided in the top surface of the nozzle head is a V-shaped notch 50 configured to receive an electrode 52.

Figure 6:
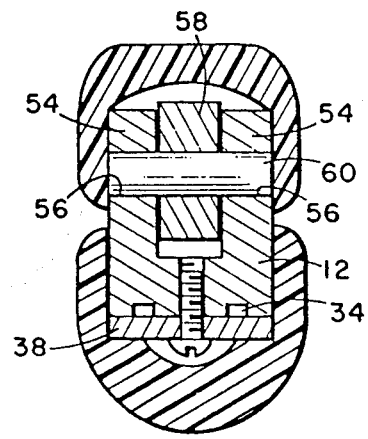
FIG. 6 is an additional cross-sectional view, as taken along the line 6—6 of FIG. 1 showing the hinged relationship of the tong portion to the body.

The body 12 has, spaced from its lower end 14, a pair of upstanding integral boss portions 54 (See FIGS. 2 and 6). Each of these boss portions 54 has an opening 56 therein. A tong member 58 is employed, a portion of which is of generally rectangular cross-section configuration and is received between the body boss portions 54. A pin 60 pivotally supports tong 58 to the body.

The tong forward portion 58A extends over nozzle head member 44 and in engagement with an electrode 52 positioned between it and the turret so as to hold the electrode in position.

The handle portion 58B extends rearwardly and in the plane of the rearward portion of the body 12 and provides means for the operator to downwardly depress the handle towards the body to remove an electrode from the torch.

Figure 7:
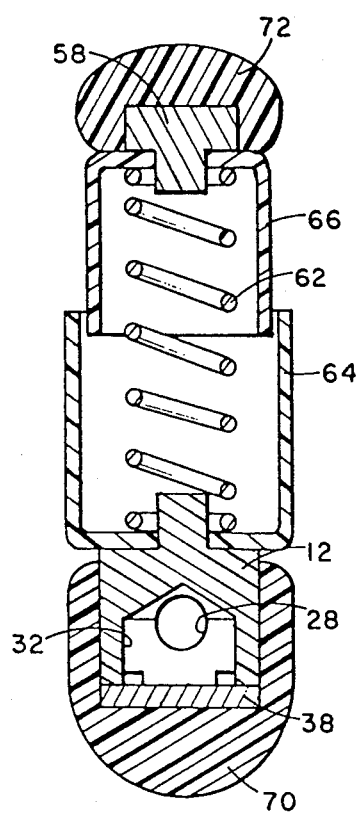
FIG. 7 is a cross-sectional view taken along the line 7—7 of FIG. 1 and showing the employment of the spring to urge the tong portion for resilient engagement with an electrode so as to removably retain the electrode in the torch.

Extending between the body 12 and tong handle portions 58B is a spring 62. Telescoping insulating cup 64 and 66 protect the spring, as shown in FIGS. 2 and 7, from inadvertent contact with a conductive member.

FIG. 2 shows the torch without insulating cover. FIGS. 1 and 4 through 7 show insulation as applied to the torch. A tubular cover member 68 made of insulating material, such as plastic, fiberglass or the like, protects the rearward portion of the torch and the forward portion of the conductor 18 and air tube 22. A semi-circular insulative cover 70 covers the forward lower portion of the torch body and an insulative cover 72 is affixed over the handle 58. By this arrangmenet the torch is protected against inadvertent contact with conductive members while in use.

FIGS. 4 through 7 show more details of the elements making up the invention, including the arrangement of the insulative covers.

The operator has complete freedom to choose the orientation of the electrode 52 with respect to the torch, whereas most torches permit only the use of an electrode pointing forwardly, that is, in the plane of the elongated axis of the torch body. In the present invention the operator can rotate the nozzle head member 44 to the orientation desired. The electrode 52 can be then inserted into the notch 50. The air holes 58 direct the air from the torch along the plane of the axis of the electrode 52 regardless of the orientation of the nozzle head, and thereby the electrode, with respect to the torch body.

The air supply and electrical energy source are preferably connected to the torch body by separate conductors, as shown. The electrical conductor 18 is an insulated, covered cable formed of many small strands of copper wire so that the cable is very flexible. A fitting 74 has a forward threaded portion 74A and a rearward tubular portion 74B. The end of the cable conductive portion is received within the tubular portion 74B and the tubular portion is crimped into a cross-sectional V-shaped configuration as shown in FIG. 8. The air hose 22 passes through fitting 74 and connects to a seat member 76 which seals against a seating surface 78 in the body 12 when fitting 74 is threaded into the body internal threads 30, the seat member 76 being separate from fitting 74. In this way the electrical service and air supply hose are more or less concentrically connected to the rear end of the torch body but with separate conductors. This greatly facilitates the repair and replacement of these items. In addition, the use of separate air and electrical conductors is much less expensive than providing a single conductor for supplying both air and electrical energy.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A holder for an arc forming electrode having means to direct the flow of air in the direction towards the arc formed by the electrode, comprising:

an elongated metallic body having a forward and a rearward end and an upper and a lower surface and an air passageway in said body formed in part of a central passageway extending from said rearward end and terminating at a point intermediate said forward and rearward ends and the air passageway formed in part by an elongated groove formed in said body lower surface, said groove extending from adjacent said body forward end and terminating at a point intermediate said forward and rearward ends, said central passageway and said groove communicating with each other at said point intermediate said body forward and rearward ends;

a cylindrical nozzle head rotatably affixed at said body forward end, the nozzle head having an upper surface having a notch formed therein to receive an electrode, the nozzle head having an internal passageway therein and a cylindrical external sidewall having an air jet opening communicating with said air passageway and oriented to eject air in alignment with said notch, said body having means for attachment of an air hose to said body, said passageway communicating said hose with said nozzle head passageway;

an elongated tong member pivotally affixed at a point intermediate its end to said body upper surface, the tong member having a forward portion extending over and adjacent said nozzle head and a rearward, handle forming portion, extending over and in the plane of said body adjacent the rearward end thereof;

a spring resiliently biasing said tong forward portion towards said nozzle head, an electrode being releasably receivable between said tong forward end and said nozzle head; and an elongated, generally flat removable cover secured to said body lower surface covering said groove, and in part defining said body air passageway, and at least one secondary passageway in said body adjacent the forward end thereof communicating said groove with said nozzle head passageway.

2. A holder for an arc forming electrode according to claim 1 including:

non-conducting covers secured to said body and said tong member covering at least the external exposed surfaces thereof.

* * * * *